US012057951B2

(12) United States Patent
Sekine

(10) Patent No.: US 12,057,951 B2
(45) Date of Patent: Aug. 6, 2024

(54) WEB CONFERENCING SYSTEM

(71) Applicant: Interactive Solutions Corp., Tokyo (JP)

(72) Inventor: Kiyoshi Sekine, Tokyo (JP)

(73) Assignee: Interactive Solutions Corp., Tokyo (JP)

( * ) Notice: Subject to any disclaimer, the term of this patent is extended or adjusted under 35 U.S.C. 154(b) by 0 days.

(21) Appl. No.: 17/773,053

(22) PCT Filed: Nov. 17, 2021

(86) PCT No.: PCT/JP2021/042256
§ 371 (c)(1),
(2) Date: Apr. 29, 2022

(87) PCT Pub. No.: WO2022/219837
PCT Pub. Date: Oct. 20, 2022

(65) Prior Publication Data
US 2023/0246863 A1   Aug. 3, 2023

(30) Foreign Application Priority Data
Apr. 15, 2021 (JP) ................................. 2021-069374

(51) Int. Cl.
*H04L 12/18* (2006.01)
(52) U.S. Cl.
CPC ............................. *H04L 12/1822* (2013.01)
(58) Field of Classification Search
CPC ............ H04L 12/1818; H04L 12/1822; G06F 16/907; G06F 16/906
See application file for complete search history.

(56) References Cited

U.S. PATENT DOCUMENTS

| | | | | |
|---|---|---|---|---|
| 7,143,177 B1* | 11/2006 | Johnson | ................ | H04L 65/612 |
| | | | | 348/E7.083 |
| 7,398,464 B1* | 7/2008 | Wei | ...................... | G06F 40/151 |
| | | | | 715/239 |
| 2013/0110937 A1* | 5/2013 | Burns | .................. | G06F 16/954 |
| | | | | 709/205 |
| 2013/0191896 A1* | 7/2013 | Adderly | ................. | H04W 4/80 |
| | | | | 709/204 |
| 2017/0105037 A1* | 4/2017 | Svendsen | ........... | H04N 21/2143 |

(Continued)

FOREIGN PATENT DOCUMENTS

| | | |
|---|---|---|
| JP | 2012-85008 A | 4/2012 |
| JP | 2020-144477 A | 9/2020 |

*Primary Examiner* — Raqiul A Choudhury
(74) *Attorney, Agent, or Firm* — Pyprus Pte Ltd; George D. Liu

(57) ABSTRACT

[Problem] To provide a web conferencing system that allows a shared material to be easily searched for and shared without disturbing the progress of the web conference. [Solution] A web conferencing system 1 that connects a first terminal 3, a second terminal 5, and a third terminal 7, the web conferencing system 1 comprising: a web conference screen display unit 11 configured to display a web conference screen on the first terminal 3 and the third terminal 7; and a material sharing unit 13 configured to: receive a sharing instruction to share a shared material from the second terminal 5; cause the first terminal and the third terminal to share the shared material.

3 Claims, 5 Drawing Sheets

(56) References Cited

U.S. PATENT DOCUMENTS

2018/0145840 A1* 5/2018 Advani ............... H04L 12/1831
2019/0199543 A1* 6/2019 Sakamoto ............ G06Q 10/10
2020/0301647 A1* 9/2020 Yoshida .............. H04L 65/403

* cited by examiner

[Fig. 1]
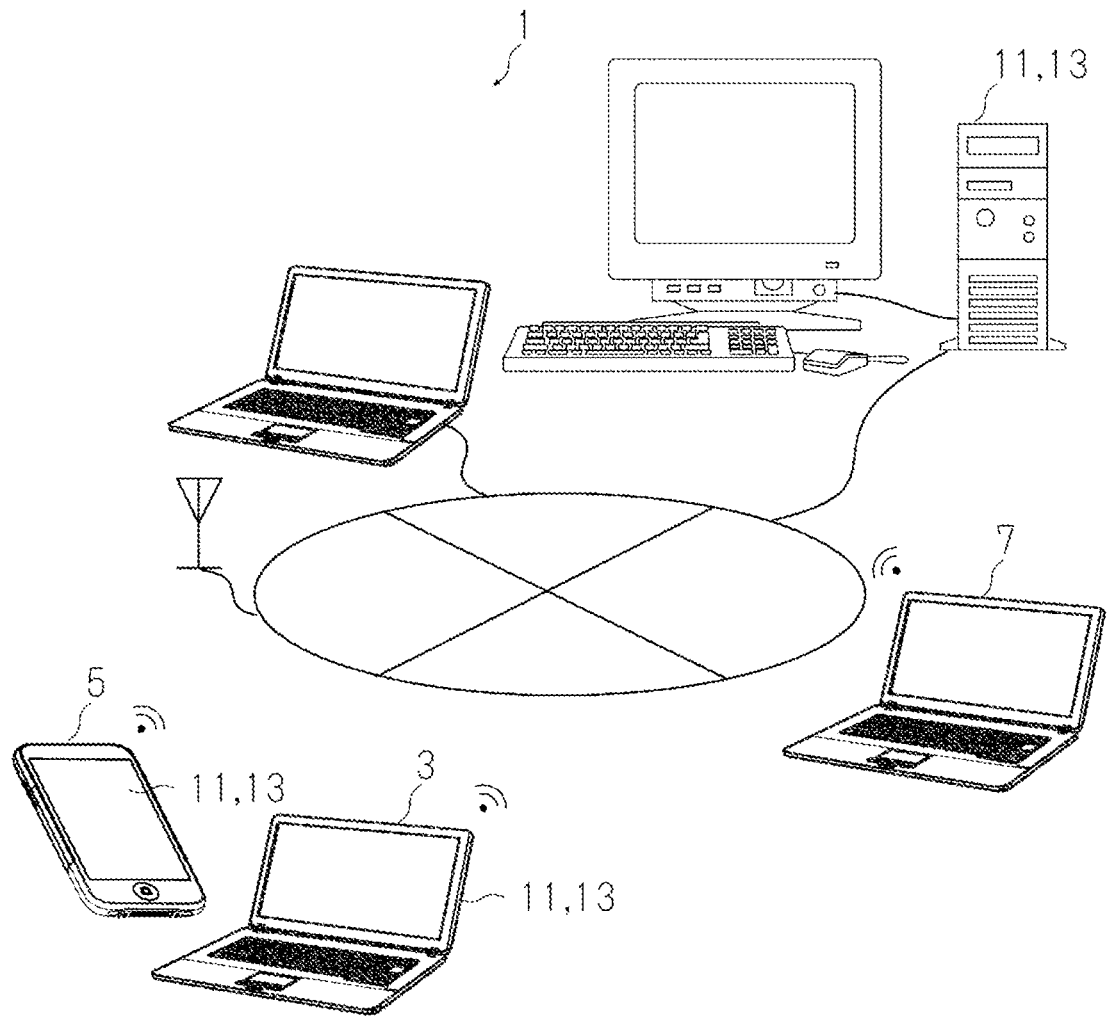
[Fig. 2]
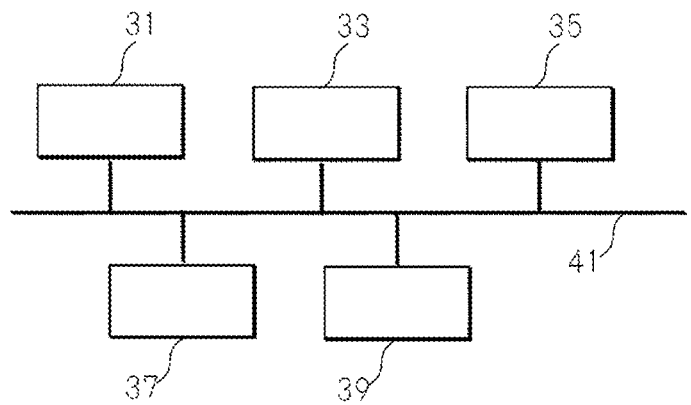

[Fig. 3]
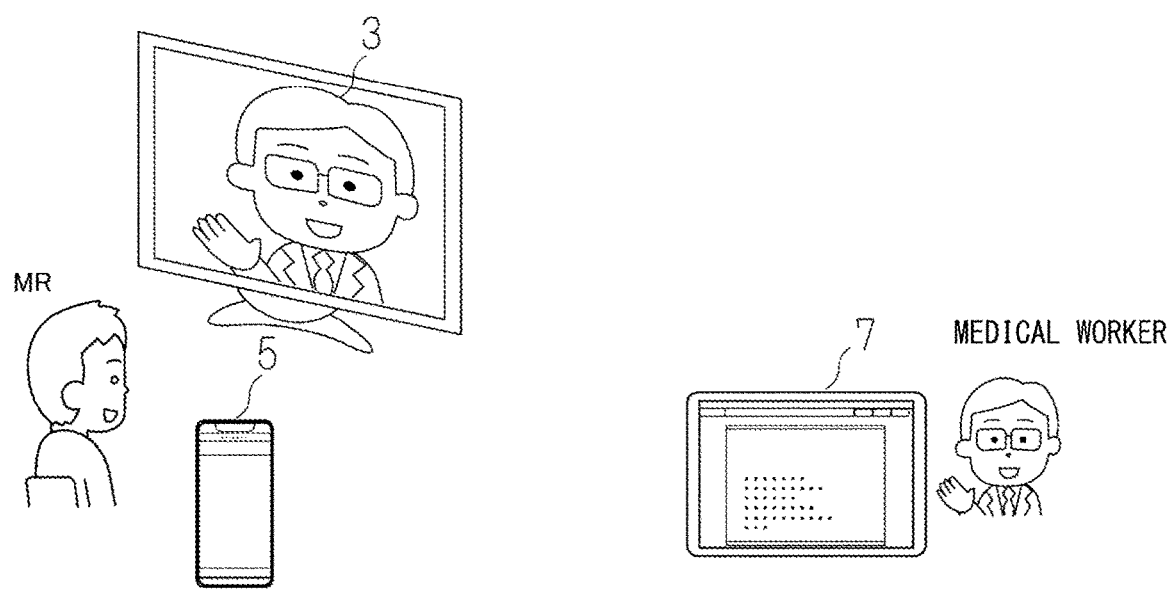

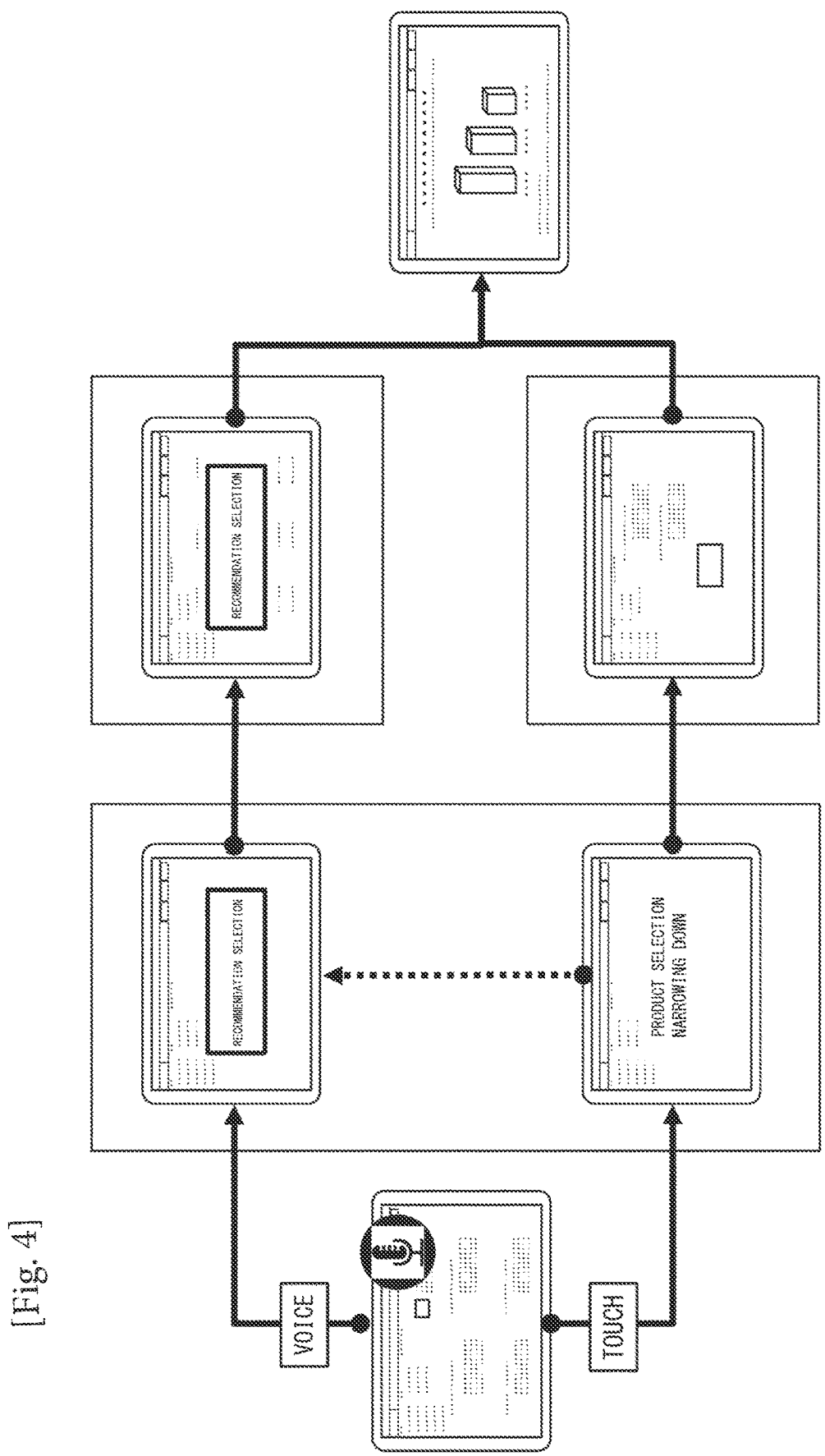
[Fig. 4]

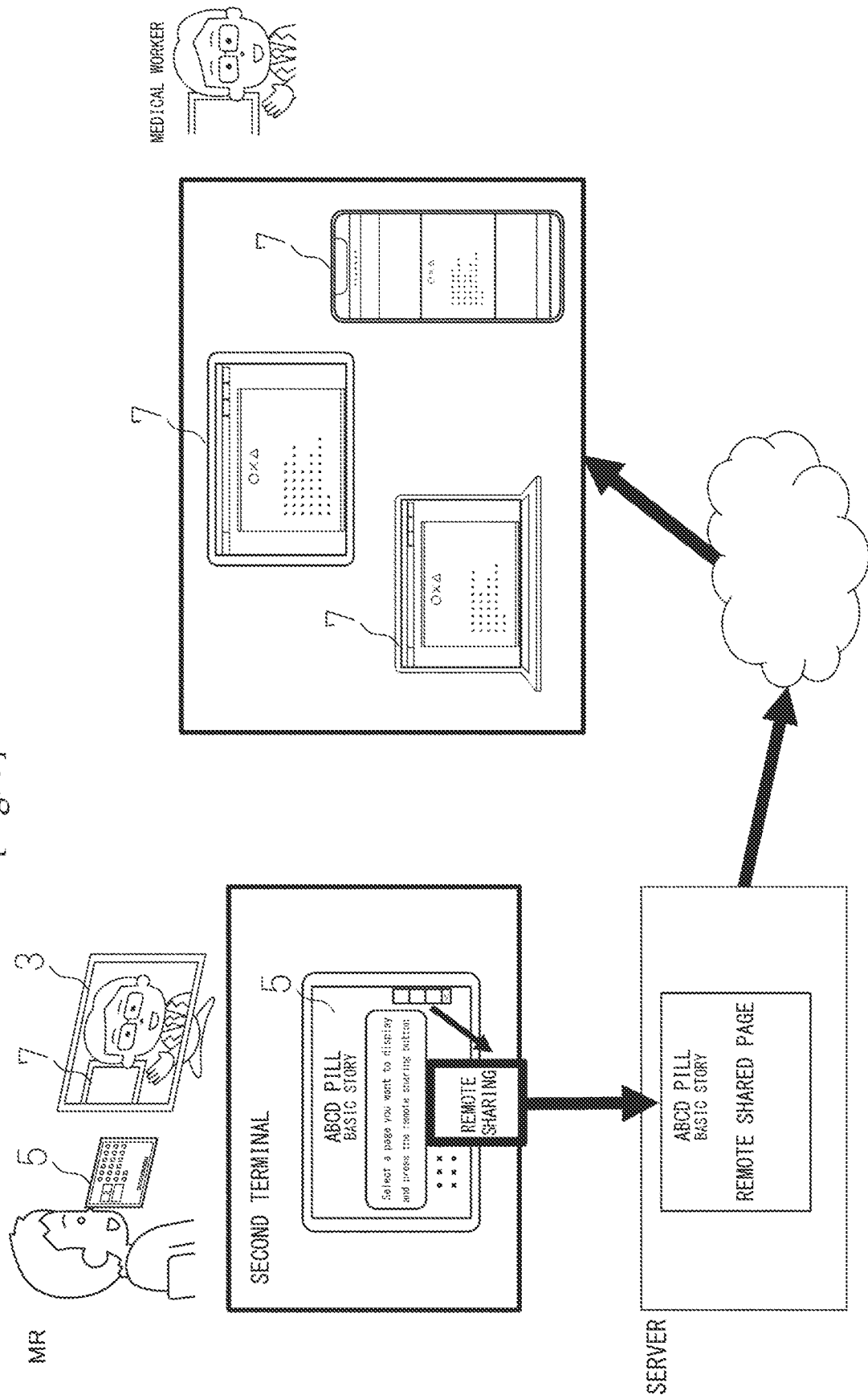

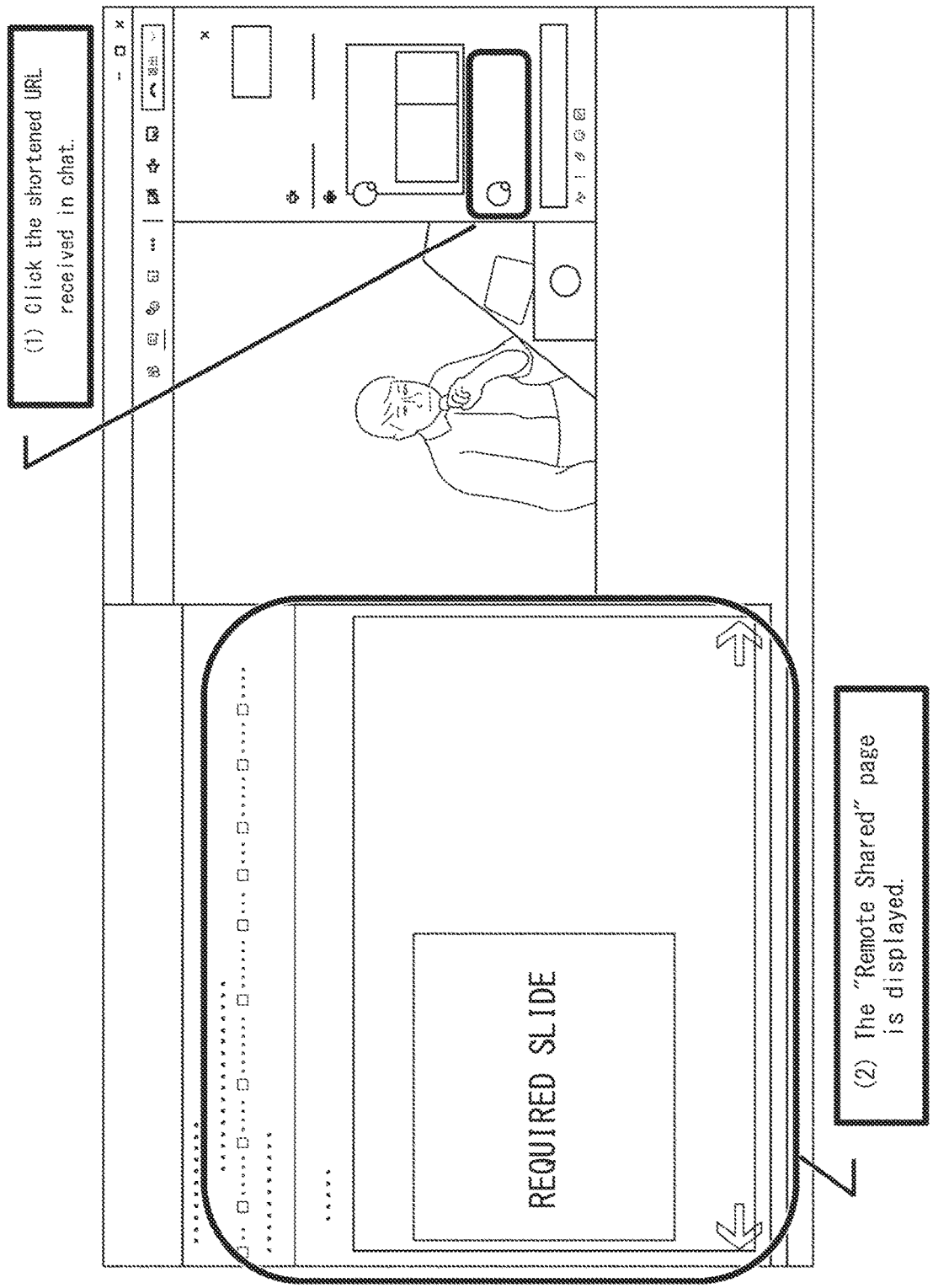

WEB CONFERENCING SYSTEM

TECHNICAL FIELD

The present invention relates to a web conferencing system. More specifically, the present invention relates to a web conferencing system that allows a participant to search for and provide materials used in a web conference by using a terminal other than terminals on which the web conference is held.

BACKGROUND ART

Japanese Patent Application Publication No. 2020-144477 describes a communication terminal capable of web conferencing. This web conferencing system allows participants of a web conference to share the materials stored in terminals on which the web conference is held.

When shared materials on a PC terminal on which a web conference is held are searched for during the web conference, it is necessary to search for the materials in a window other than the window through which the web conference is held. At this time, it becomes necessary to overlap some windows or reduce the size of the window. As a result, in such a conventional web conferencing system, it may be difficult to find the necessary materials or it may be difficult to view the web conference.

CITATION LIST

Patent Literature

[PTL 1] Japanese Patent Application Publication No. 2020-144477

SUMMARY OF INVENTION

Technical Problem

An object of the present invention is to provide a web conferencing system that allows a shared material to be easily searched for and shared without disturbing the progress of the web conference.

Solution to Problem

Basically, the above problem can be solved by preparing a terminal for providing a material in addition to the terminal on which a web conference is held so that the material searched for by the terminal can be shared in the web conference.

The present invention relates to a web conferencing system 1. This web conferencing system 1 is a system that connects a first terminal 3, a second terminal 5, and a third terminal 7. The second terminal 5 is preferably a terminal that does not participate in a web conference in which the first terminal 3 and the third terminal 7 participate.

In addition, the web conferencing system 1 includes a web conference screen display unit 11 and a material sharing unit 13.

The web conference screen display unit 11 is a means for displaying a web conference screen on the first terminal 3 and the third terminal 7.

The material sharing unit 13 is a means for receiving a sharing instruction to share shared material from the second terminal 5, and causing the first terminal and the third terminal to share the shared material.

In a preferred example of the present invention, the shared material is a material searched for and extracted in the second terminal 5. The second terminal 5 is preferably a terminal that does not participate in a web conference in which the first terminal 3 and the third terminal 7 participate. In other words, even if the second terminal 5 does not participate in the web conference, the shared material stored in the second terminal 5 or the shared material according to the instruction from the second terminal 5 can be provided to the web conference and be shared among the participating terminals.

In a preferred example of the present invention, the second terminal 5 makes an approval request to approve the material sharing, and when the approval request is approved, the second terminal 5 causes the third terminal 7 to share the shared material.

In a preferred example of the present invention, the first terminal 3 receives the approval request. When the first terminal 3 approves the approval request, the first terminal 3 and the third terminal 7 share the shared material. Then, the shared material is displayed on a display unit of the first terminal 3 and a display unit of the third terminal 7.

Advantageous Effects of Invention

According to the present invention, it is possible to provide a web conferencing system that allows a shared material to be easily searched for and shared without disturbing the progress of the web conference.

BRIEF DESCRIPTION OF DRAWINGS

FIG. 1 is a conceptual diagram for explaining a web conferencing system according to the present invention, wherein the web conferencing system includes a server computer including a processor embedded with a web conference screen display unit 11 and a material sharing unit 13.

FIG. 2 is a block diagram illustrating a basic configuration of a computer.

FIG. 3 is a conceptual diagram illustrating an example of a web conference.

FIG. 4 is a conceptual diagram illustrating a display example of a mobile terminal used by an MR.

FIG. 5 is a conceptual diagram illustrating an example of a sequence from an approval request to the sharing of a shared material.

FIG. 6 is a conceptual diagram illustrating an example, different from FIG. 5, of a sequence from an approval request to the sharing of a shared material.

DESCRIPTION OF EMBODIMENTS

Embodiments of the present invention will be described below with reference to the drawings. The present invention is not limited to the embodiments described below, and includes modifications of the following embodiments as appropriate within a scope obvious to those skilled in the art.

FIG. 1 is a conceptual diagram for explaining a web conferencing system according to the present invention. This device is a computer-based processing device. The computer may be any one of a mobile terminal, a desktop personal computer, and a server, or a combination of two or more thereof. These devices are typically connected to each other so that information can be exchanged via the Internet (intranet) or the like. The functions may be distributed to a plurality of computers, such as assigning some functions to one of the computers.

As illustrated in FIG. 1, the web conferencing system 1 includes a first terminal 3, a second terminal 5, and a third terminal 7. These terminals are connected to each other so that information can be exchanged. These terminals do not need to be physically connected to each other and may be capable of exchanging information wirelessly. The second terminal 5 is preferably a terminal that does not participate in a web conference in which the first terminal 3 and the third terminal 7 participate. In addition, the web conferencing system 1 includes a server computer including a processor embedded with a web conference screen display unit 11 and a material sharing unit 13. The web conference screen display unit 11 and the material sharing unit 13 may be embedded in a processor in any one of the first terminal 3, the second terminal 5, and the third terminal 7 so that any one of the first terminal 3, the second terminal 5, and the third terminal 7 can be functioned as the server computer. The web conference screen display unit 11 is a means for displaying a web conference screen on the first terminal 3 and the third terminal 7. The material sharing unit 13 is a means for receiving a sharing instruction to share shared material from the second terminal 5, and causing the first terminal and the third terminal to share the shared material.

This system may include terminals for specific speakers or conference participants connected to the Internet or an intranet (the first terminal 3 and the second terminal 5) and a server connected to the Internet or the intranet. Of course, a single computer or mobile terminal may function as the apparatus according to the present invention, or a plurality of servers may be deployed. Further, this system may include a plurality of terminals (including a third terminal 7) for participants connected to the Internet or an intranet.

FIG. 2 is a block diagram illustrating a basic configuration of a computer. As illustrated in FIG. 2, the computer includes an input unit 31, an output unit 33, a control unit 35, a computation unit 37, and a storage unit 39, and these elements are connected by a bus 41 or the like so that information can be exchanged therebetween. For example, the storage unit may store a control program and/or various information. When specified information is input from the input unit, the control unit reads a control program stored in the storage unit. Then, the control unit reads information stored in the storage unit as appropriate and transmits it to the computation unit. The control unit also transmits the appropriately input information to the computation unit. The computation unit performs operation processing using various received information and stores the result in the storage unit. The control unit reads the operation result stored in the storage unit and outputs it from the output unit. In this way, various processing is executed. Each unit executes the various corresponding processing.

As illustrated in FIG. 1, the web conferencing system 1 is a system that connects the first terminal 3, the second terminal 5, and the third terminal 7. The web conferencing system 1 is known as ZOOM (registered trademark), Teams (registered trademark), and Meet (registered trademark). In the web conferencing system, a plurality of terminals may share a web conference screen so that the plurality of terminals can hold a web conference. In addition, the web conferencing system 1 includes a web conference screen display unit 11 and a material sharing unit 13. Such a system 1 can be implemented, for example, by a program being installed on each server or terminal.

The web conference screen display unit 11 is a means for displaying a web conference screen on the first terminal 3 and the third terminal 7. In this example, the first terminal 3 and the third terminal 7 are terminals that participate in the web conference. A window for the web conference is displayed on the display units (monitors) of the terminals (a plurality of terminals including the first terminal 3 and the third terminal 7) participating in the web conference, so that a conference screen is shared. Voice is input and output through microphones and speakers of the first terminal 3 and the third terminal 7. Voice input to a terminal is shared among the terminals participating in the web conference (a plurality of terminals including the first terminal 3 and the third terminal 7) in the web conferencing system 1.

The material sharing unit 13 is a means for receiving a sharing instruction to share shared material from the second terminal 5, and causing the first terminal and the third terminal to share the shared material. The sharing instruction may be received by the first terminal, or may be received by a management server of the web conferencing system 1 (a server connected to the first terminal, the second terminal, and the third terminal so as to exchange information with them). The material sharing unit 13 may be included in the first terminal 3 or in (the management server of) the web conferencing system 1. The second terminal 5 is preferably a terminal that does not participate in a web conference in which the first terminal 3 and the third terminal 7 participate. In this case, the second terminal may not display a window for displaying a captured image or the like for a web conference. In other words, in this example, even if the second terminal 5 does not participate in the web conference, the shared material stored in the second terminal 5 or the shared material according to the instruction from the second terminal 5 can be provided to the web conference and be shared among the participating terminals.

In a preferred example of the present invention, the shared material is a material searched for and extracted in the second terminal 5. The second terminal 5 may include a voice analysis unit. In this case, when voice is input from the input unit (microphone) of the second terminal, the voice analysis unit analyzes the voice and uses the resulting analyzed words to read candidates for shared materials from the storage unit. The read candidates for shared materials are displayed on the display unit of the second terminal 5. Then, one of the candidates is selected as a shared material. In this way, the shared material may be determined. Further, a predetermined input may be made by the input unit of the second terminal (e.g., a touch panel input unit, a mouse, or a keyboard), and based on the input information, candidates for shared materials may be read from the storage unit and displayed on the display unit. In this case as well, a predetermined input is made from the input unit of the second terminal, and one of the candidates is selected as a shared material. In this way, the shared material may be determined. A model example of this system is that one user operates the first terminal 3 and the second terminal 5.

In a preferred example of the present invention, the second terminal 5 makes an approval request to approve the material sharing to the first terminal 3. Then, when the first terminal 3 approves the approval request, the shared material is shared with the third terminal 7.

Next, an operation example of the web conferencing system 1 will be described. The present invention is not limited to the example described below. In this example, the first terminal 3 is a PC terminal operated by an MR (medical representative). The second terminal 5 is a mobile terminal (iPad (registered trademark)) operated by the MR. The third terminal 7 is a PC terminal operated by a medical worker such as a doctor. The first terminal 3, the second terminal 5, and the third terminal 7 are connected to the management server of the web conferencing system 1 so that information can be exchanged.

FIG. 3 is a conceptual diagram illustrating an example of a web conference. As illustrated in FIG. 3, the monitor of the first terminal 3 used by an MR and the monitor of the third terminal 7 used by a doctor (medical worker) each display a window for a web conference. Then, a presentation material is displayed in the window. In this state, the MR and the doctor have a meeting about a certain medicine. The MR is in a situation of being able to operate the second terminal 5.

Process of Presenting Candidates for Shared Materials and Process of Determining Shared Material FIG. 4 is a conceptual diagram illustrating a display example of a mobile terminal (iPad (registered trademark) or the like) used by an MR. This mobile terminal includes a microphone for inputting voice to the terminal and a touch panel for inputting information. Now consider that the MR wants to present a shared material during a web conference. Then, the MR speaks to the mobile terminal which is the second terminal 5.

For example, the MR speaks to the iPad (registered trademark) as an "AIPURO (registered trademark) pill".

Then, a voice from the MR is input into the second terminal 5 from the input unit (microphone) of the second terminal 5. The voice is stored in the storage unit of the second terminal 5 as appropriate. Then, the second terminal 5 reads the voice stored in the storage unit. The second terminal 5 causes the computation unit to analyze the voice based on a command of the control program. Then, the second terminal 5 identifies the voice as "AIPURO (registered trademark) pill" as a result of the analysis. The second terminal 5 stores the analysis result "AIPURO (registered trademark) pill" in the storage unit as appropriate. The second terminal 5 reads the analysis result "AIPURO (registered trademark) pill" from the storage unit, and reads, as candidates for shared materials, materials related to "AIPURO (registered trademark) pill" from presentation materials and related materials stored in the storage unit.

The read candidates for shared materials are displayed on the monitor of the second terminal 5. The MR touches the touch panel. Then, information indicating that one of the candidates has been selected as a shared material is input to the second terminal 5. In this way, the shared material is determined.

Further, the MR touches the "AIPURO (registered trademark) pill" part from among the candidates displayed on the touch panel of the second terminal 5.

Alternatively, the MR inputs "AIPURO (registered trademark) pill" on the touch panel. Then, the second terminal 5 reads the candidates for shared materials from the storage unit based on the input information and displays them on the display unit. In this case as well, a predetermined input is made from the input unit of the second terminal, and one of the candidates is selected as a shared material. In this way, the shared material may be determined.

Approval Request Example 1

FIG. 5 is a conceptual diagram illustrating an example of a sequence from an approval request to the sharing of a shared material.

Once the shared material is determined, the approval of the approval request is allowed to be input on the display unit (monitor) of the second terminal. As an example, when the shared material is determined, the control unit of the second terminal 5 displays on the monitor an icon for sharing the shared material from the storage unit.

For example, an icon containing the characters "Remote Sharing" is displayed on the touch panel. This is an example of an approval request to approve material sharing.

The MR touches the icon part on the touch panel. Then, information that the approval request has been approved is input to the second terminal 5.

The information that the approval request has been approved is stored in the storage unit of the second terminal 5 as appropriate. The second terminal 5 sends the shared material to the management server by using the information that the approval request has been approved. The management server outputs the input shared material to the first terminal 3 and the third terminal 7. Then, the first terminal 3 and the third terminal 7 share the shared material. Then, the shared material is displayed on a display unit of the first terminal 3 and a display unit of the third terminal 7.

The arrows in FIG. 5 indicate the steps of processing. In an example of FIG. 5, a doctor and the third terminal 7 which is a terminal owned by the doctor are displayed on the first terminal 3 for an MR. The MR and the doctor hold a web conference by using the first terminal 3 and the third terminal 7, respectively, to start an application for the web conference. Next, while they hold the conference through the first terminal 3 and the third terminal 7, the MR tries to share a specific material by a voice input or the like to the second terminal 5 to find a predetermined shared material. After the shared material is found, in this example, a remote sharing button is displayed on the second terminal 5. The MR finds and presses the remote sharing button. Then, in this example, the shared material is sent to the server for the web conference. The first terminal, the second terminal, and the third terminal are registered in the server in advance as terminals related to this web conference. Then, the shared material sent to the server is displayed on the display units of the first terminal, the second terminal, and the third terminal. In this way, the shared material searched by the MR will be displayed on the monitor owned by the doctor. The third terminal may be a mobile device, a tablet, or a PC.

Approval Request Example 2

FIG. 6 is a conceptual diagram illustrating an example, different from FIG. 5, of a sequence from an approval request to the sharing of a shared material.

In this example, when a shared material is determined, shared material determination information on the shared material being determined is output from the second terminal 5 to the management server. This shared material determination information may be output to the first terminal 3. Further, the shared material may be output to the management server as appropriate and stored in the management server. The management server receives the shared material determination information and creates access information for reading the shared material. Examples of access information include a URL (uniform resource locator), which is address information of shared information stored in the management server, and link information. The control program of the management server is configured to send the access information (URL) to the first terminal 3 in response to receiving the shared material determination information from the second terminal 5. Accordingly, the access information (URL) is sent from the management server to the first terminal 3. Then, the access information (URL) is displayed in a certain part (e.g., a chat window) on the display unit of the first terminal 3.

After the access information (URL) is displayed on the display unit of the first terminal 3, the MR approves the access information (URL). Specifically, the MR may click the part where the access information (URL) is displayed with the mouse. Further, in a case where the display unit of the first terminal 3 is a touch panel, the MR may touch the part where the access information (URL) is displayed. Further, an icon related to the approval request may be displayed on the display unit of the first terminal 3 so that the access information (URL) is approved when the icon is selected.

When the access information (URL) is approved, the first terminal 3 and the third terminal 7 access the storage unit of the management server. Then, the management server outputs the input shared material to the first terminal 3 and the third terminal 7. Then, the first terminal 3 and the third terminal 7 share the shared material. Then, the shared material is displayed on a display unit of the first terminal 3 and a display unit of the third terminal 7. Then, the shared material is displayed on the first terminal 3 and the third terminal 7, so that the material can be shared using the conferencing system used in both terminals during the conference. Multiple people may perform operations for the material sharing at the same time.

An example of including the first terminal, the second terminal, and the third terminal has been described above. On the other hand, the first terminal and the second terminal may be implemented by applications on one computer terminal. In particular, when one computer terminal uses dual monitors, that described as the first terminal may be an application displayed on one screen (monitor), and that described as the second terminal may be an application displayed on the other screen (monitor). Each terminal may be a virtual computer or software.

INDUSTRIAL APPLICABILITY

The present invention is available in the information and communication industry.

REFERENCE SIGNS LIST

1 Web conferencing system
3 First terminal
5 Second terminal
7 Third terminal
11 Web conference screen display unit
13 Material sharing unit

The invention claimed is:

1. A web conferencing system (1) that connects a first terminal (3), a second terminal (5), and a third terminal (7), the web conferencing system (1) comprising:
  a processor embedded in a server computer, the first terminal (3), or the third terminal (7), whereby the processor is configured to
  display a web conference screen on a display unit of the first terminal (3) and a display unit of the third terminal (7); and
  whereby the processor is configured to:
    receive a sharing instruction to share a shared material from the second terminal (5);
    cause the first terminal (3) and the third terminal (7) to share the shared material; and
    display the shared material on the web conference screen displayed on the display unit of the first terminal (3) and the web conference screen displayed on the display unit of the third terminal (7),
  wherein the web conference screen is not displayed on the second terminal (5), and
  the second terminal (5) is a terminal that does not participate in a web conference in which the first terminal (3) and the third terminal (7) participate.

2. The web conferencing system according to claim 1, wherein
  the shared material is a material searched for and extracted by the second terminal (5),
  the second terminal (5) makes an approval request to approve material sharing, and
  when the approval request is approved, the second terminal (5) causes the third terminal (7) to share the shared material.

3. The web conferencing system according to claim 2, wherein
  the first terminal (3) receives the approval request, and
  when the first terminal (3) approves the approval request, the first terminal (3) and the third terminal (7) share the shared material, and the shared material is displayed on the display unit of the first terminal (3) and the display unit of the third terminal (7).

* * * * *